United States Patent [19]

Moulies et al.

[11] Patent Number: 4,871,506

[45] Date of Patent: Oct. 3, 1989

[54] PROCESS FOR MANUFACTURING FILMS FROM SEMI-CRYSTALLINE FLUID POLYMERS BY COEXTRUSION AND TUBULAR FILM BLOWING

[75] Inventors: Jean-Claude Moulies; Gerard Reignier, both of Serquigny, France

[73] Assignee: Atochem, Paris La Defense, France

[21] Appl. No.: 138,507

[22] Filed: Dec. 24, 1987

[30] Foreign Application Priority Data

Jan. 21, 1987 [FR] France ................................ 87 00667

[51] Int. Cl.$^4$ ............................................. B29C 47/06
[52] U.S. Cl. .................................... 264/514; 264/166; 264/173; 425/133.1; 425/326.1; 425/462
[58] Field of Search ............... 264/514, 512, 564, 173, 264/171, 166; 425/131.1, 133.1, 133.5, 326.1, 462

[56] References Cited

U.S. PATENT DOCUMENTS

| | | |
|---|---|---|
| 3,223,761 | 12/1965 | Raley .................................. 264/173 |
| 3,322,870 | 5/1967 | Sacks .................................. 264/514 |
| 3,337,665 | 8/1967 | Underwood et al. ............... 264/514 |
| 3,880,691 | 4/1975 | Pannenbecker et al. ........... 264/173 |
| 4,379,117 | 4/1983 | Baird, Jr. et al. .................. 264/514 |
| 4,415,519 | 11/1983 | Strassel ............................ 425/133.5 |

Primary Examiner—Jeffery Thurlow
Attorney, Agent, or Firm—Sigalos, Levine & Montgomery

[57] ABSTRACT

A process for manufacturing thermoplastic polymer films by coextrusion comprising coextruding by blow extrusion at least two thermoplastic polymers, one of the polymers being a semi-crystalline fluid polymer, the other a thermoplastic polymer incompatible with and with no adhesive affinity for the semi-crystalline fluid polymer and possessing sufficient extrudate strength to support the semi-crystalline polymer, cooling the coextrudate, separation of the resulting films, and recovering at least the semi-crystalline thermoplastic polymer film thus formed in the form of a film of substantially uniform thickness.

1 Claim, No Drawings

PROCESS FOR MANUFACTURING FILMS FROM SEMI-CRYSTALLINE FLUID POLYMERS BY COEXTRUSION AND TUBULAR FILM BLOWING

BACKGROUND OF THE INVENTION

The present invention pertains to a process for manufacturing films by the blow extrusion process from semi-crystalline fluid polymers, consisting of coextruding the semi-crystalline fluid polymer with an incompatible thermoplastic resin.

Thin films of thermoplastic polymers are usually obtained by the blow extrusion process, consisting of extruding a thermoplastic polymer through an annular die, generally upward, with the extrudate being simultaneously pulled longitudinally by a drawing device, usually one with rollers, and inflated by a constant volume of air trapped between the die, the drawing system and the wall of the tube. The inflated tube, also called a bubble, is cooled as it emerges from the die, generally by an air blowing ring. The bubbles are flattened and rolled up either as a tube or; after being cut, into two separate films.

This conventional process is at least difficult if not impossible to use in the case of blow extrusion of semi-crystalline polymer tubes. In this case, the forces involved, such as the drawing force, internal pressure of the bubble, gravity and others, are applied to an extrudate whose mechanical strength is very low. This results in significant deformations of the bubble, leading to the formation of creases in the film after the bubble has been flattened and to a total absence of control over the thickness distribution of the film.

SUMMARY OF THE INVENTION

The technique according to the invention makes it possible to overcome these disadvantages and to create semi-crystalline fluid polymer films of uniform and controlled thickness.

The instant process comprises coextruding a semi-crystalline fluid polymer by the blow coextrusion process with a thermoplastic resin which is incompatible, so that after the bubble has been cooled and flattened, the two extruded films are recovered separately by conventional means, such as by individual coiling of the separated films.

DETAILED DESCRIPTION

Semi-crystalline fluid polymers are understood to be polyamides and other polymers whose viscosity in the molten state is low (or, in the context of the invention, preferably less than $10^3$ Pa's under flow conditions within the die) and capable of developing a significant degree of crystallinity in the solid state, generally in excess of 10%. When crystal melting occurs, the viscosity of these polymers drops drastically. Examples that might be mentioned include the polyamides and their copolymers, polyesters [such as polybutylene terephthalate (PBT) or polyethylene terephthalate (PET)] and their copolymers, polypropylene, polyvinylidene fluoride and its copolymers, and ethylenehydroxyalkyl ester copolymers (EVOH).

The incompatible thermoplastic resin must have no affinity, and especially no adhesion affinity, for the semi-crystalline fluid polymer. This resin must be such that once coextruded with the semi-crystalline fluid polymer, its film can be effortlessly separated from the polymer film, meaning a total absence of adhesion between the two materials. This resin, which serves as a support for the semi-crystalline polymer during extrusion and blowing must, of course, possess sufficient extrudate strength; i.e., high-temperature strength in the molten material, to withstand the stresses of extrusion and blowing and of the semi-crystalline polymer. To do so, this resin must have a relatively high viscosity in the molten state, on the order of $10^3$ to $10^4$ Pa's under a shear velocity of 100 $s^{-1}$, as well as good shear and tensile strength.

Among the resins capable of being used, high pressure polyethylenes, impact polystyrene and plasticized polyvinyl chloride may be mentioned as examples.

With the process according to the invention, it is possible to manufacture semi-crystalline fluid polymer films of low thickness on the order of 10 to 200 microns, with a thickness uniformity of ±15%.

The relative thicknesses of the extruded materials at the extrudate level are adjusted both as a function of the desired final thickness of the semi-crystalline polymer and as a function of the bubble strength of the incompatible polymer. In general, the thickness of the incompatible polymer film is between 0.5 and ten times, preferably between one and five times, greater than that of the semi-crystalline polymer film.

According to the blow extrusion method described above, the semi-crystalline fluid polymer and the incompatible thermoplastic resin are coextruded simultaneously. After the bubble has cooled, the coextruded material exists in the form of a tube which is flattened and cut longitudinally, producing superimposed films of semi-crystalline polymer and incompatible thermoplastic resin. These different films are separated and stored separately, for example, by coiling onto individual spools.

Since extrusion and blowing act to form a tube, it is unimportant whether the thermoplastic resin is located on the inside or the outside of the tube. It is also possible to coextrude more than two films. In addition, if the thermoplastic resin support film is not to be retained, it is possible to recycle it into the system to form a new support film.

The invention will be further described in connection with the following example which is set forth for purposes of illustration only.

EXAMPLE

Using a blow coextrusion line consisting of two 45 mm diameter extruders equipped with screws with a length/diameter ratio of 20, supplying an annular die with a diameter of 150 mm and an outlet air gap of one mm, polyvinylidene fluoride (FORAFLON 1000 HD) is extruded from the first extruder at a temperature of 250° C. to form a 25-micron outer layer, and low-density polyethylene with a melting index MI=0.3 and a density of 0.923 is extruded from the second extruder at a temperature of 230° C. to form a 60-micron inner layer. Compressed air is blown into the system to form a tube 225 mm in diameter. The tube is cooled by an air blower ring placed on the die, then by ambient air as it travels from the ring to the drawing rollers. After flattening, the tube is cut into films on a roller. Lastly, the polyvinylidene fluoride and polyethylene films are each coiled separately.

The resulting polyvinylidene fluoride film as a substantially uniform thickness of 23 microns with a tolerance of ± 3 microns.

While the invention has been described in connection with a preferred embodiment, it is not intended to limit the scope of the invention to the particular form set forth, but, on the contrary, it is intended to cover such alternatives, modifications, and equivalents as may be included within the spirit and scope of the invention as defined by the appended claims.

What is claimed is:

1. A process for manufacturing thermoplastic polymer films by coextrusion comprising coextruding by blow extrusion to form a co-extrudate consisting of polyvinylidene fluoride and low density polyethylene, the film thickness of the low density polyethylene being between 0.5 and ten times greater than that of the film of the polyvinylidene fluoride, the viscosity of polyvinylidene fluoride being lower than $10^3$ Pa's in the molten state, and the polyvinylidene fluoride degree of crystallinity being greater than 10% in the solid state, cooling the coextrudate, separating the resulting films, and recovering at least the semi-crystalline polyvinylidene fluoride film thus formed in the form of a film of substantially uniform thickness.